United States Patent [19]

Nagaoka et al.

[11] Patent Number: 4,967,869
[45] Date of Patent: Nov. 6, 1990

[54] TORQUE DISTRIBUTION CONTROL SYSTEM FOR FOUR-WHEEL DRIVE VEHICLE

[75] Inventors: Mitsuru Nagaoka; Mitsuo Yasuno, both of Hiroshima, Japan

[73] Assignee: Mazda Motor Corporation, Hiroshima, Japan

[21] Appl. No.: 329,601

[22] Filed: Mar. 28, 1989

[30] Foreign Application Priority Data

Mar. 28, 1988 [JP] Japan .................. 63-73865

[51] Int. Cl.⁵ .............................. B60K 17/34
[52] U.S. Cl. ...................... 180/244; 180/197
[58] Field of Search ............. 180/244, 197, 248; 364/426.01

[56] References Cited

U.S. PATENT DOCUMENTS 3,802,528  4/1974  Leiber ........................ 180/197 X
4,154,487  5/1979  Vannini et al. ............... 180/197 X

FOREIGN PATENT DOCUMENTS 60-248440  12/1985  Japan .

Primary Examiner—Charles A. Marmor
Assistant Examiner—Alan M. Kagen
Attorney, Agent, or Firm—Sixbey, Friedman, Leedom & Ferguson

[57] ABSTRACT

A torque distribution control system for a four-wheel drive vehicle has an engine output controller which controls the output of the engine of the vehicle, a braking controller which separately controls the braking forces applied to the left wheels and the right wheels and/or the braking forces applied to the front wheels and the rear wheels. A torque distribution changing system determines the torque distribution to the wheels according to the running condition of the vehicle and controls the braking controller and the engine output controller to apply a braking force to one of the front wheels and the rear wheels or one of the left wheels and the right wheels and to increase the output of the engine by an amount substantially corresponding to the braking force applied to the one of the front wheels and the rear wheels or the one of the left wheels and the right wheels so that the torque distribution determined according to the running condition of the vehicle can be obtained.

17 Claims, 7 Drawing Sheets

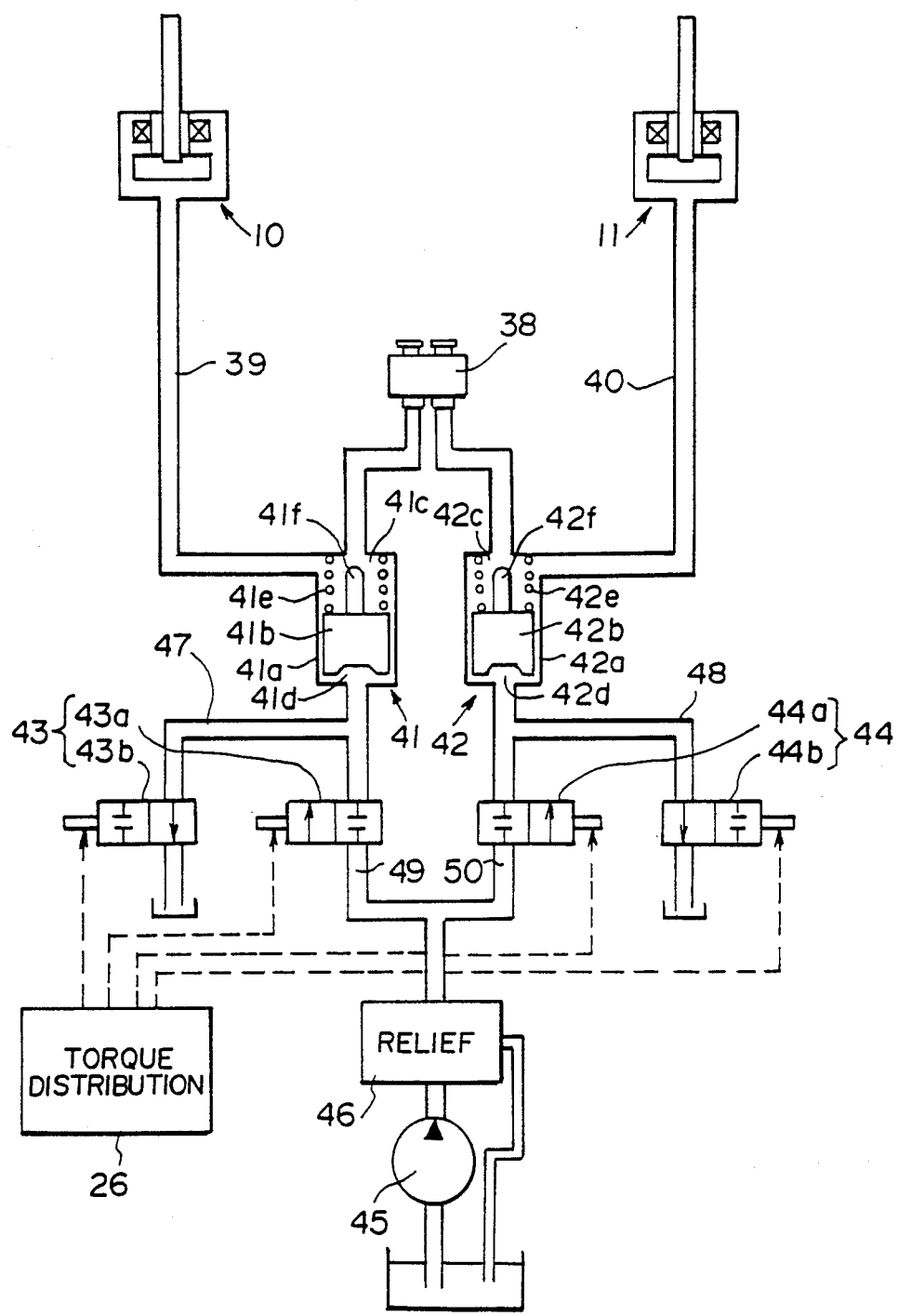

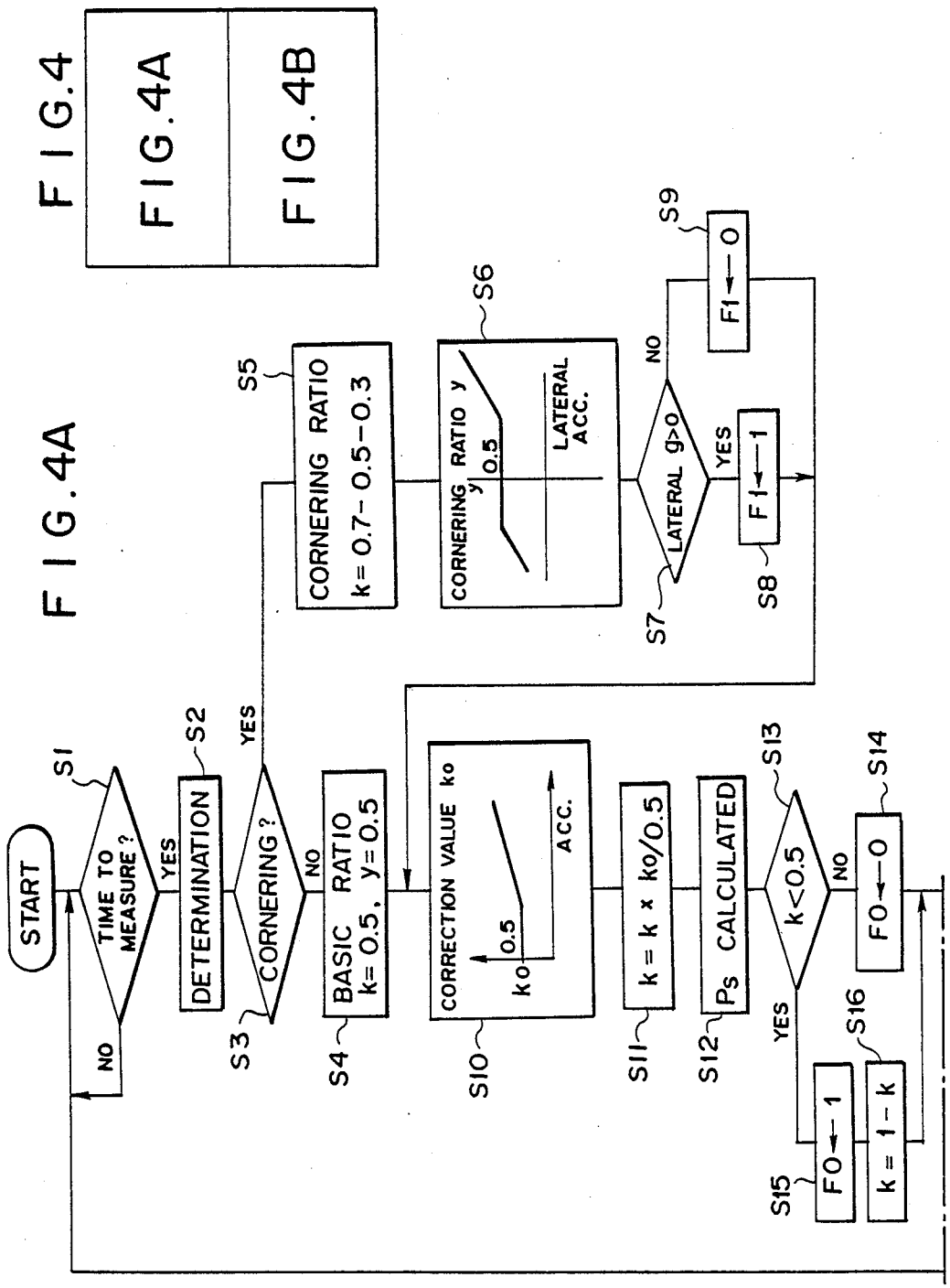

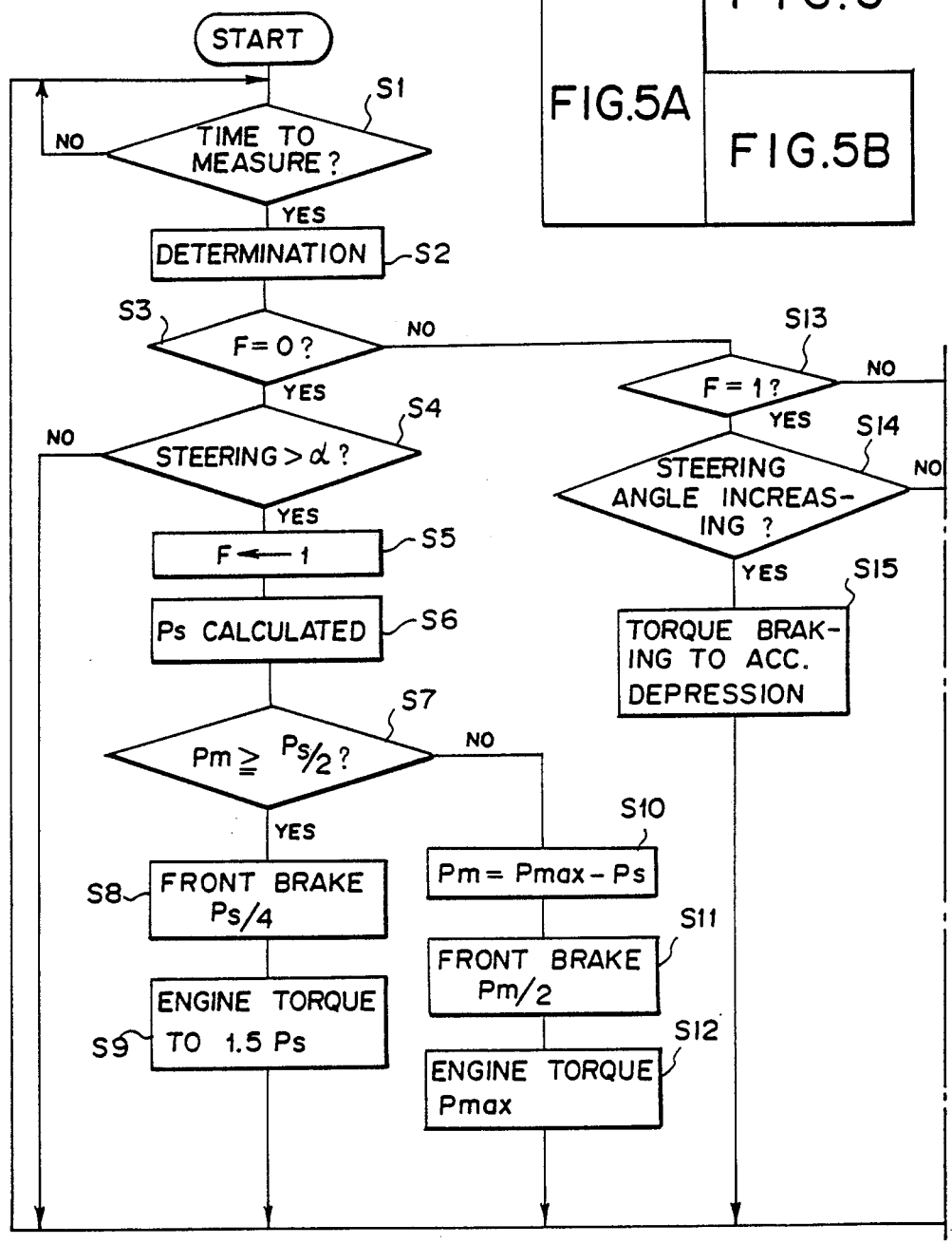
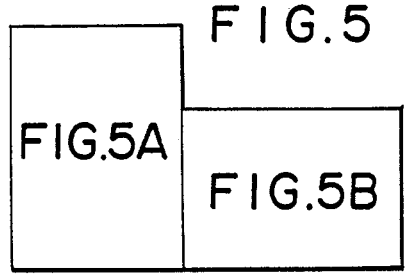

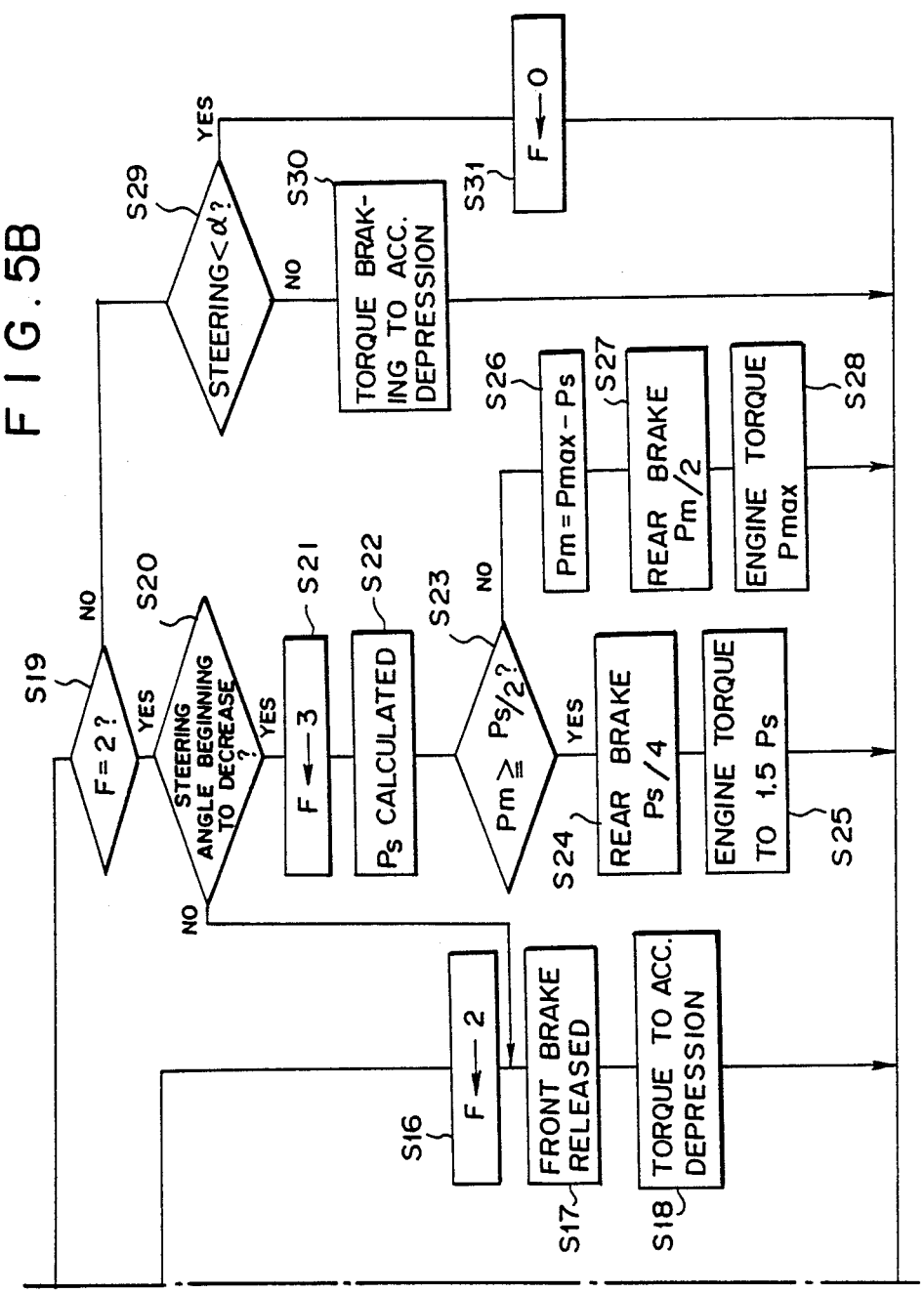

TORQUE DISTRIBUTION CONTROL SYSTEM FOR FOUR-WHEEL DRIVE VEHICLE

BACKGROUND OF THE INVENTION

1. Field of the Invention:

This invention relates to a torque distribution control system for a four-wheel drive vehicle which controls the torque distribution to the individual wheels.

2. Description of the Prior Art:

There have been known various systems for controlling distribution of the engine output torque to the front wheels and the rear wheels in a four-wheel drive vehicle. For example, the four-wheel drive vehicle disclosed in Japanese Unexamined Patent Publication No. 60(1985)-248440, a center differential is provided to distribute the engine output to the individual wheels, the braking system is arranged so that the braking forces applied to the individual wheels can be separately controlled, and when a wheel slips, braking force is applied to the wheel. That is, when the slipping wheel is braked, the torque exerted by the wheel becomes different from that exerted by the other wheels, whereby the driving forces of the individual wheels can be made appropriate.

Generally, a vehicle is in contact with the ground by way of four wheels, and accordingly, the critical performance of the vehicle is limited by the frictional force of the tires which solely depends upon the product of the friction coefficient $\mu$ of the road surface and the load W on the tires. Driving force, braking force and centrifugal force act on the tires, and the vehicle cannot be stabilized in running unless the sum of the vectors of these forces is within the frictional force of the tires.

The load acting on the tires is shifted by the longitudinal acceleration or the lateral acceleration generated during running and causes load differences among the tires, which results in difference in supporting performance between the tires. This is significant especially when the friction coefficient $\mu$ of the road surface is small.

In the four-wheel drive vehicle, the load on one tire is reduced by distributing the driving force to the four tires in order to stabilize the vehicle on a road having a low friction coefficient $\mu$. However, when the front wheels and the rear wheels are connected by way of the center differential, the driving torque is uniformly distributed to the front wheels and the rear wheels, and since slip is more apt to occur in the wheel bearing thereon lighter load, the performance of the vehicle is limited by the tire having the worst performance.

By varying the torque distribution to the front wheels from that to the rear wheels, performance of each tire can be better used. However, in order to directly control the torque distribution to the front wheels and the rear wheels by controlling, for instance, engagement of a clutch disposed in the center differential, the system must be large in size because of large engine output torque to be distributed. This adds to the weight and the cost of the system and to limitation in incorporating the system in the vehicle.

On the other hand, in the system in which the slipping wheel is braked when slip occurs in the front wheels or the rear wheels, the vehicle is decelerated in response to application of the brake to the slipping wheel.

SUMMARY OF THE INVENTION

In view of the foregoing observations and description, the primary object of the present invention is to provide a torque distribution control system for a four-wheel drive vehicle in which the torque distribution can be changed without use of a mechanism such as a clutch for changing the transmitting torque and without decelerating the vehicle.

This invention is based on the fact that the torque distribution should be varied from the front wheels to the rear wheels or from the left wheels to the right wheels mainly when the vehicle is accelerated on a road having a low friction coefficient in such a manner that can cause a load shift or when the vehicle is turned and a centrifugal force acts on the wheels in addition to the driving force and that loss in the engine output power can be accepted to some extent in such cases since the engine output power has a sufficient torque margin relative to the performance of the tires in such cases.

That is, the torque distribution control system for a four-wheel drive vehicle in accordance with this embodiment comprises an engine output control means which controls the output of the engine of the vehicle, braking control means which separately controls the braking forces applied to the left wheels and the right wheels and/or the braking forces applied to the front wheels and the rear wheels, and a torque distribution changing means which controls the braking control means and the engine output control means to apply a braking force to one of the front wheels and the rear wheels or one of the left wheels and the right wheels and to increase the output of the engine by an amount substantially corresponding to the braking force applied to said one of the front wheels and the rear wheels or said one of the left wheels and the right wheels so that the torque distribution determined according to the running condition of the vehicle can be obtained.

FIG. 1 shows the basic arrangement of the torque distribution control system in accordance with the present invention.

In FIG. 1, a four-wheel drive vehicle 1 has an engine E. The output of the engine E is transmitted to a left front wheel 5, a right front wheel 6, a left rear wheel 7 and a right rear wheel 8 by way of a center differential 2, a front differential 3 and a rear differential 4. The output of the engine E is uniformly transmitted to the front wheels and the rear wheels. An engine output control means A controls the output of the engine E, for instance, by controlling the opening of the throttle valve of the engine E. The wheels 5 to 8 are respectively provided with brake devices 10 to 12. The braking force applied to the front wheels 5 and 6 is controlled separately from the braking force applied to the rear wheels 7 and 8 by a braking control means B. Further, the braking force applied to the left wheels 5 and 7 is controlled separately from the right wheels 6 and 8 by the braking control means B.

The engine output control means A and the braking control means B operate under the control of a torque distribution changing means C. The torque distribution changing means C receives signals from an accelerator position sensor 23, a longitudinal acceleration sensor 30, a lateral acceleration sensor 31, a steering angle sensor 32, a throttle position sensor 33, and a boost sensor 34, and controls the engine output control means A and the braking control means B according to the running condition of the vehicle, thereby controlling the torque distribution to the wheels. The torque distribution changing means C controls the braking control means B to apply a braking force to the wheels the torque distribution to which is to be reduced and controls the engine output control means A to increase the output of the engine by an amount substantially corresponding to the braking force applied to the wheels, thereby compensating for the torque lost by the application of the braking force.

In the torque distribution control system with the arrangement described above, when the output of the engine is increased by an amount substantially corresponding to the braking force applied to the wheels the torque distribution to which is to be reduced, a half of the increase in the output of the engine is transmitted to each of the front wheels and the rear wheels. Accordingly, the torque which actually acts on the road surface from the wheels to which the braking force is being applied is kept at the value before the braking is applied while the torque which actually acts on the road surface is increased, whereby the effective torque distribution to the wheels to which the braking force is applied and the wheels to which the braking force is not applied is changed.

BRIEF DESCRIPTION OF THE DRAWINGS

FIG. 3 is a schematic view showing an example of the brake system which can be employed in the present invention, FIG. 4 represents the arrangement of FIGS. 4A and 4B. FIGS. 4A and 4B are a flow chart for illustrating the operation of the torque distribution changing means, and FIG. 5 represents the arrangement of FIGS. 5A and 5B. FIGS. 5A and 5B are a view similar to FIG. 4 but for illustrating the operation of the torque distribution changing means for another embodiment of the present invention.

DESCRIPTION OF THE PREFERRED EMBODIMENTS

Figure 1:
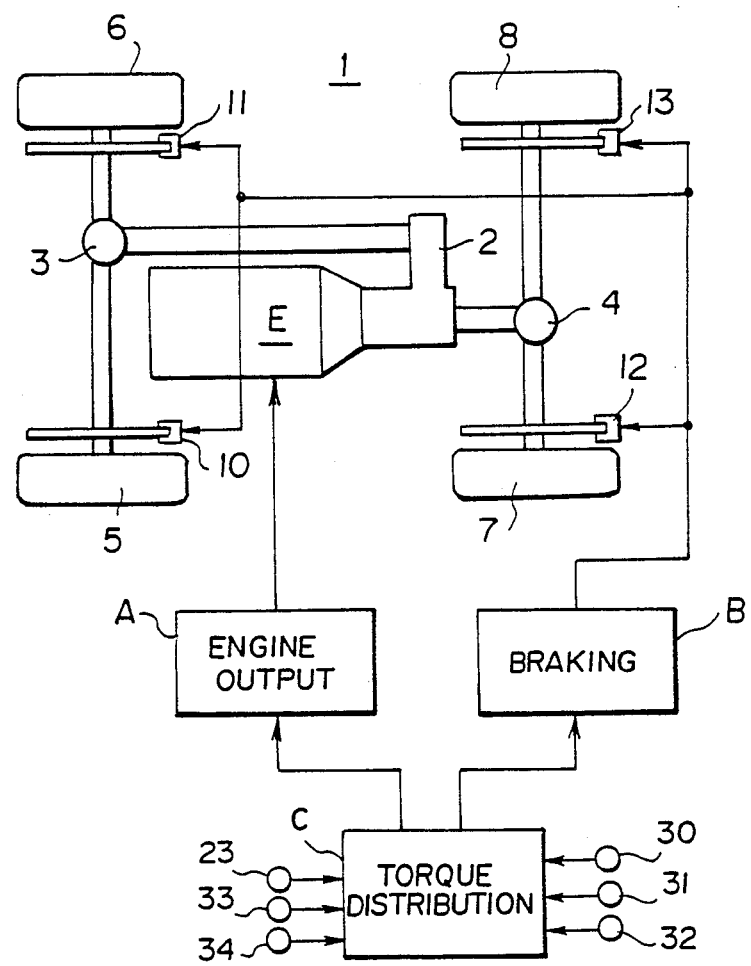
FIG. 1 is a schematic view showing a general arrangement of the torque distribution control system in accordance with the present invention.
Figure 2:
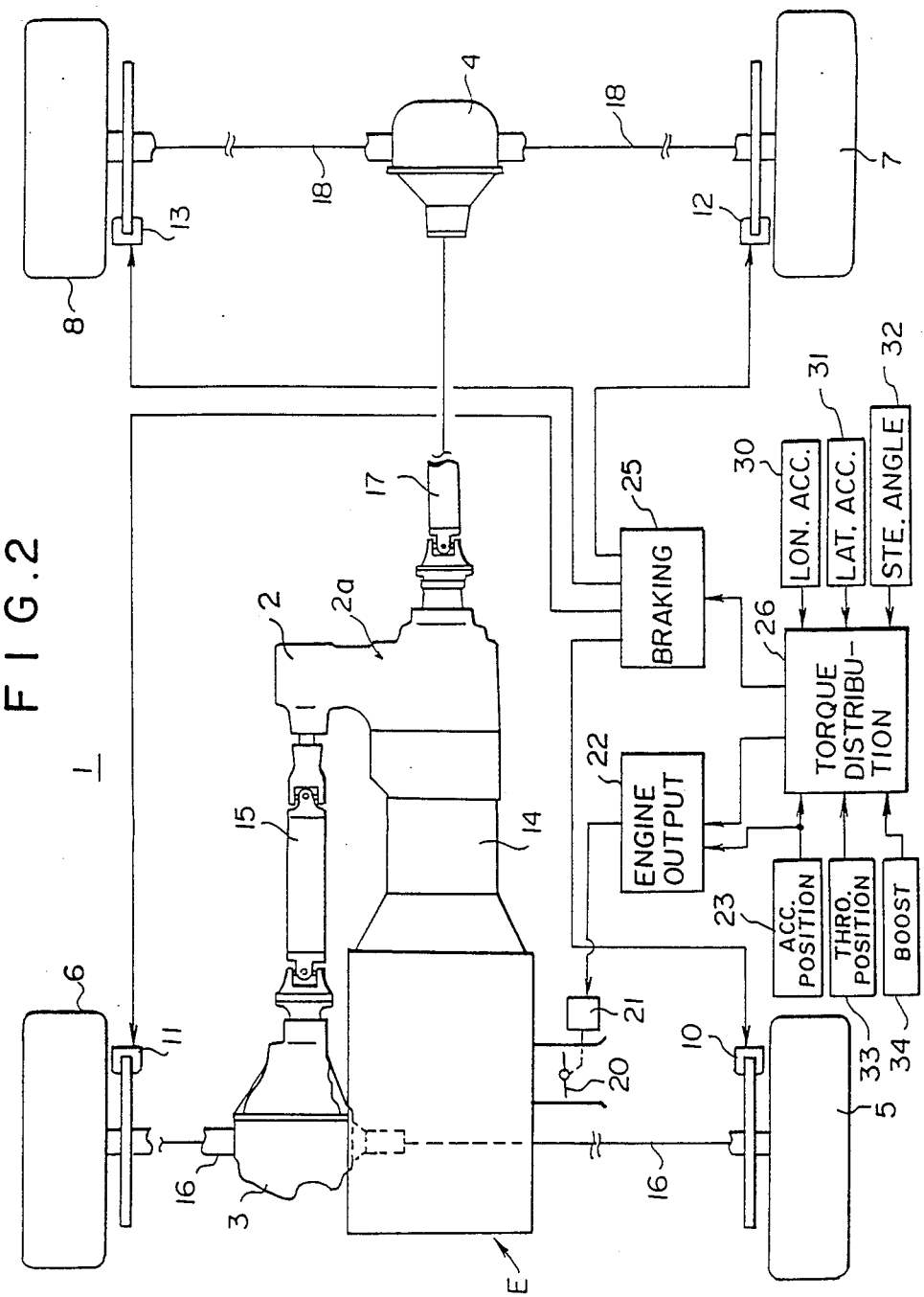
FIG. 2 is a schematic view of a torque distribution control system in accordance with a first concrete embodiment of the present invention.

In FIG. 2 showing an embodiment of the present invention, the parts analogous to the parts shown in FIG. 1 are given the same reference numerals. The output of the engine E is transmitted to a transmission 14 which is connected to a transfer 2a having the center differential 2. The transfer 2a has a front wheel side output shaft 15 and a rear wheel side output shaft 17. The front wheel side output shaft 15 is connected to the front differential 3 which is connected to the left and right front wheels 5 and 6 by way of front driving axles 16. The rear wheel side output shaft 17 is connected to the rear differential 4 which is connected to the left and right rear wheels 7 and 8 by way of rear driving axles 18. The center differential 2 uniformly distributes the engine output to the front wheels 5 and 6 and the rear wheels 7 and 8.

The engine E has a throttle valve 20 which is driven by a throttle motor 21. The throttle motor 21 is controlled by an engine controller 22 (as the engine output control means A) to control the output of the engine E. The engine controller 22 receives an accelerator position signal from the accelerator position sensor 23 and controls the opening of the throttle valve 20 according to the amount of depression of the accelerator pedal (not shown).

The left and right front wheels 5 and 6 and the left and right rear wheels 7 and 8 are respectively provided with left and right front brake devices 10 and 11 and left and right rear brake devices 12 and 13. The braking pressures to be fed to the respective brake devices 10 to 13 is controlled separately from each other by a brake controller 25 (as the braking control means B) so that the braking forces applied to the four wheels from the respective brake devices 10 to 13 can be controlled separately from each other.

The engine controller 22 and the brake controller 25 are controlled by control signals output from a torque distribution changing 26. The torque distribution changing means 26 receives the accelerator position signal from the accelerator position sensor 23, a longitudinal acceleration signal from a longitudinal acceleration sensor 30, a lateral acceleration signal from a lateral acceleration sensor 31, a steering angle signal from a steering angle sensor 32, a throttle position signal from a throttle position sensor 33, and a boost signal from a boost sensor 34.

The torque distribution changing means 26 applies braking forces to the front wheels 5 and 6 by way of the front brake devices 10 and 11 when a load shift toward the rear wheels 7 and 8 occurs. e.g., when the vehicle is started and accelerated, and controls the engine 1 by way of the engine controller 22 to increase the output of the engine by an amount corresponding to the braking forces applied to the front wheels 5 and 6, thereby varying the torque distribution to the wheels 5 to 8 with the total driving torque acting on the road surface from the wheels 5 to 8 fixed. During cornering, the torque distribution changing means 26 applies braking forces to the front wheels 5 and 6 when the vehicle enters the corner and to the rear wheels 7 and 8 when the vehicle goes out of the corner. Further during a left cornering, the torque distribution changing means 26 applies braking forces to the left wheels 5 and 7 since a load shift toward the right wheels 6 and 8 occurs, and during a right cornering, the torque distribution changing means 26 applies braking forces to the right wheels 6 and 8 since a load shift toward the left wheels 5 and 7 occurs. Further, the torque distribution changing means 26 controls the engine controller 22 to increase the engine output torque by an amount corresponding to the torque lost by the application of the braking forces.

The structure of the brake controller 25 will be described in detail with reference to FIG. 3, hereinbelow. The system for feeding the braking pressure to the brake devices 10 and 11 for the left and right front wheels 5 and 6 is shown in FIG. 3. The brake devices 10 and 11 comprise a caliper for a disk brake in this particular embodiment.

A hydraulic braking pressure is fed to the brake device 10 for the left front wheel 5 by way of a first hydraulic line 39 and to the brake device 11 for the right front wheel 6 by way of a second hydraulic line 40. A first braking pressure control valve 41 is provided in the first hydraulic line 39 and a second braking pressure control valve 42 is provided in the second hydraulic line 40. The first braking pressure control valve 41 comprises a cylinder 41a and a piston 41b inserted into the cylinder 41a to divide the inner space of the cylinder 41a into a variable volume chamber 41c and a control chamber 41d. The piston 41b is urged by a spring 41e in the direction in which the volume of the variable volume chamber 41c is enlarged. Similarly, the second braking pressure control valve 42 comprises a cylinder 42a and a piston 42b inserted into the cylinder 42a to divide the inner space of the cylinder 42a into a variable volume chamber 42c and a control chamber 42d. The piston 42b is urged by a spring 42e in the direction in which the volume of the variable volume chamber 42c is enlarged. The variable volume chambers 41c and 42c are respectively positioned in the first and second hydraulic pressure lines 39 and 41 which respectively connect the brake devices 10 and 11 to a master cylinder 38. That is, braking forces produced in the master cylinder 38 is fed to the brake devices 10 and 11 by way of the variable volume chambers 41c and 42c.

The piston 41b of the first braking pressure control valve 41 is provided with a check valve 41f which is adapted to close the opening of the variable volume chamber 41c open to the master cylinder 38. That is, when a control pressure is introduced into the control chamber 41d and the piston 41b is moved overcoming the force of the spring 41e, the check valve 41f breaks the communication between the variable volume chamber 41c and the master cylinder 38 and the pressure produced in the variable volume chamber 41c is fed to the brake device 10. The piston 42b of the second braking pressure control valve 42 is provided with a check valve 42f similar to the check valve 41f of the first braking pressure control valve 41.

The first braking pressure control valve 41 is operated by a boosting solenoid 43a and a pressure reducing solenoid 43b. Similarly, the second braking pressure control valve 42 is operated by a boosting solenoid 44a and a pressure reducing solenoid 44b. The boosting solenoid 43a and the pressure reducing solenoid 43b forms an actuator 43 for the first braking pressure control valve 41, and the boosting solenoid 44a and the pressure reducing solenoid 44b forms an actuator 44 for the second braking pressure control valve 42. The control chambers 41d and 42d are communicated with an oil pump 45 respectively by way of control pressure feed lines 49 and 50. The boosting solenoids 43a and 44a are respectively provided in the control pressure feed lines 49 and 50. Reference numeral 46 denotes a relief valve. The pressure reducing solenoid 43b and 44b are respectively provided in drain lines 47 and 48 from the control chambers 41d and 42d. The solenoids 43a, 43b, 44a and 44b are opened and closed by signals from the torque distribution changing means 26. When the boosting solenoid (43a, 44a) is opened and the pressure reducing solenoid (43b, 44b) is closed, a control pressure is introduced into the control chamber (41d, 42d), and when the boosting solenoid is closed and the pressure reducing solenoid is opened, the control pressure in the control chamber is released. Though only the system for feeding the braking pressure to the brake devices 10 and 11 for the front wheels 5 and 6 is shown in FIG. 3, a similar system is provided for the brake devices 12 and 13 for the rear wheels 7 and 8. Thus, in this embodiment, the braking pressure can be separately fed to the individual brake devices 10 to 13.

Figure 4B:
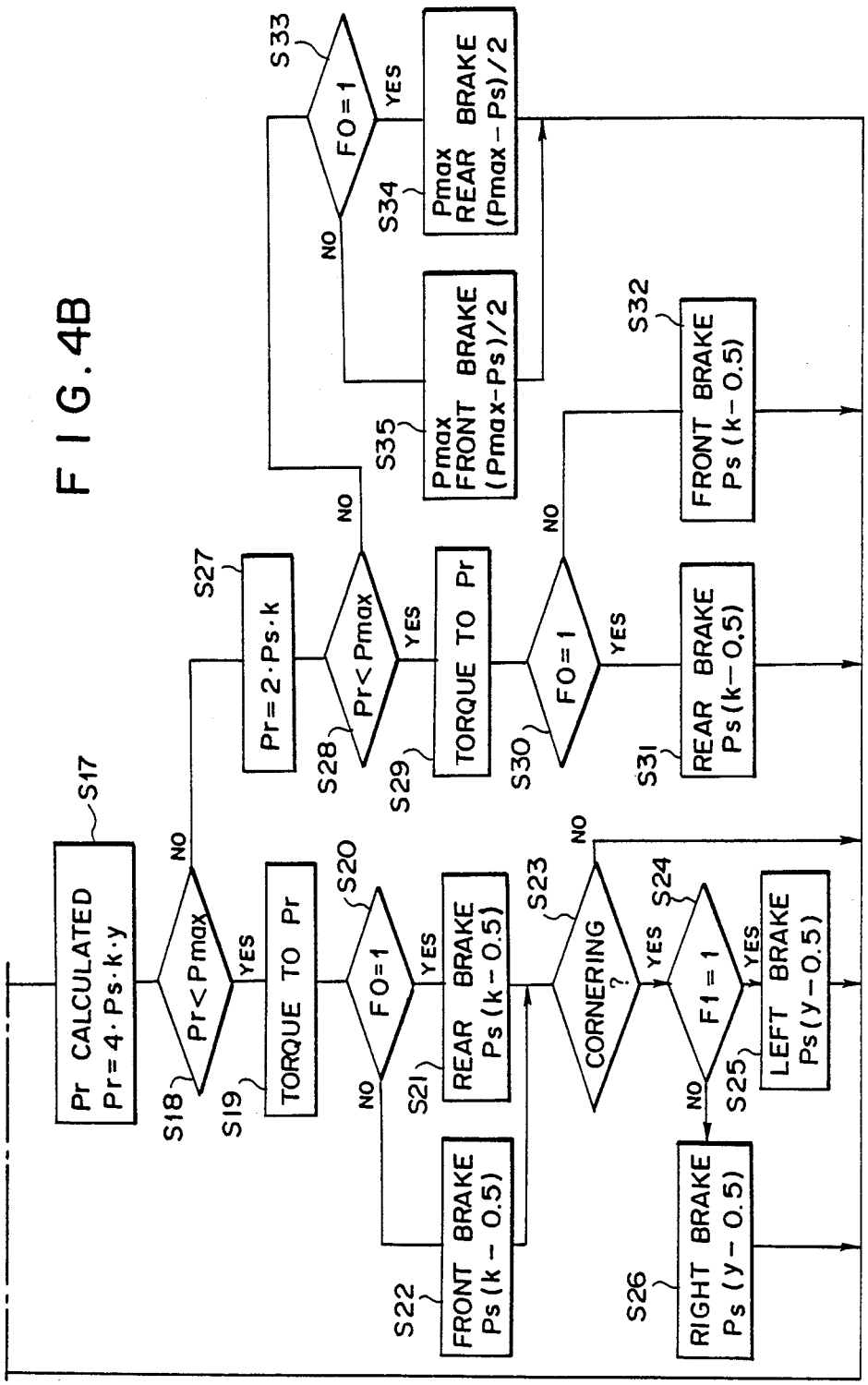

The operation of the torque distribution changing means 26 will be described with reference to the flow chart shown in FIG. 4. The torque distribution changing means 26 determines the longitudinal acceleration, the lateral acceleration, the amount of depression of the accelerator, the boost, and the steering angle on the basis of the signals from the sensors 23 and 30 to 34 at predetermined intervals (Steps S1 and S2).

Then, in step S3, the torque distribution changing means 26 determines whether the vehicle is cornering on the basis of whether the steering angle is larger than a predetermined value. When it is determined in the step S3 that the vehicle is not cornering, the torque distribution changing means 26 sets a basic torque distribution equally to all the wheels in step S4. That is, the ratio of the torque distribution to the rear wheels to the whole torque output from the engine. (This ratio will be referred to as "the rear wheel distribution ratio k", hereinbelow.) and the ratio of the torque distribution to the front wheels to the whole torque output from the engine (This ratio will be referred to as "the front wheel distribution ratio", hereinbelow.) are both set to be 0.5, and the ratio of the torque distribution to the left wheels to the whole torque output from the engine (This ratio will be referred to as "the left wheel distribution ratio", hereinbelow.) and the ratio of the torque distribution to the right wheels to the whole torque output from the engine (This ratio will be referred to as "the right wheel distribution ratio y", hereinbelow.) are both set to be 0.5.

On the other hand, when it is determined in the step S3 that the vehicle is now cornering, the torque distribution changing means 26 proceeds to step S5 and determines the rear wheel distribution ratio k according to the course of the cornering. That is, when the vehicle is entering a corner, the rear wheel distribution ratio k is set to be 0.7 so that the torque distribution to the rear wheels is larger than that to the front wheels, when the vehicle is cornering, the rear wheel distribution ratio k is set to be 0.5 so that the torque is equally distributed to the front and rear wheels, and when the vehicle is going out of the corner, the rear wheel distribution ratio k is set to be 0.3 so that the torque distribution to the front wheels is larger than that to the rear wheels. By improving the heading performance at the beginning of the cornering by enlarging the driving force of the rear wheels and by improving the straight running performance at the end of the cornering, the cornering performance can be improved as a whole.

Further, in step S6, the torque distribution changing means 26 determines the torque distribution to the left and right wheels during the cornering. The torque distribution to the left and right wheels during the cornering is determined so that the outer/inner distribution ratio (the ratio of the torque distribution to the outer wheels to the torque distribution to the inner wheels) becomes larger as the lateral acceleration increases. That is, when the vehicle is making a left cornering, the ratio of the torque distribution to the right wheel to the torque distribution to the left wheel is set to be larger than 0.5 and the value of the ratio is increased as the rightward acceleration increases, and when the vehicle is making a right cornering, the ratio of the torque distribution to the left wheel to the torque distribution to the right wheel is set to be larger than 0.5 and the value of ratio is increased as the leftward acceleration increases. When it is determined that the vehicle is making a left cornering, a cornering flag F1 is set at 1, and otherwise, the cornering flag F1 is set at 0 (steps S7 and S9).

After the steps S7 to S9 or the step S4, the torque distribution changing means 26 proceeds to step S10. In the step S10, the torque distribution changing means 26 determines a rear wheel distribution ratio correction value ko according to the longitudinal acceleration. The correction value is set so that the torque distribution to the rear wheels is increased, irrespective of whether the vehicle is making a cornering, when the vehicle is being accelerated. Then the torque distribution changing means 26 corrects the rear wheel distribution ratio k determined in the step S4 or S5 on the basis of the correction value ko in step S11. By this correction, the torque distribution to each of the rear wheels becomes larger than the torque distribution to the front wheel on the same side when the vehicle is being accelerated irrespective of whether the vehicle is making a cornering.

Then, in step S12, the torque distribution changing means 26 determines the present engine output torque Ps on the basis of the boost and the throttle opening or the amount of depression of the accelerator pedal. In the next step S13, it is determined whether the rear wheel distribution ratio k has been set to be smaller than 0.5. When it is determined in the step S13 that the rear wheel distribution ratio k is larger than 0.5, i.e., that the torque distribution to the rear wheels is larger than that to the front wheels, the torque distribution changing means 26 resets an acceleration flag FO at 0 in step S14. Otherwise, the torque distribution changing means 26 sets the acceleration flag FO at 1 in step S15, and substitutes $1-k$ for k, thereby converting the value of the rear wheel distribution ratio k to a value larger than 0.5 (step S16).

Then, in step S17, the torque distribution changing means 26 determines a torque requirement Pr required to obtain the rear wheel distribution ratio k and the outer/inner distribution ratio y thus determined. The torque requirement Pr is obtained by quadrupling the torque distribution Ps·k·y to the wheels the torque distribution to which is maximum. Then, in step S18, it is determined whether the torque requirement Pr is smaller than the maximum output torque Pmax of the engine. When it is determined that the former is smaller than the latter, i.e., that there remains a torque margin, the torque distribution changing means 26 increases the throttle opening to converge the actual engine output torque on the torque requirement Pr. In the next step S20, it is determined whether the acceleration flag FO is in "1" position. When it is determined that the acceleration flag FO is in "0" position, i.e., that is vehicle is being accelerated, the torque distribution changing means 26 controls the brake devices 10 and 11 to apply to the front wheels 5 and 6 braking forces which correspond to a half of the difference between the torque distribution to the front wheels and the torque distribution to the rear wheels, thereby reducing the driving torque of the front wheels (step S22). On the other hand, when it is determined that the acceleration flag FO is in "1" position, i.e., that is vehicle is not being accelerated, the torque distribution changing means 26 controls the brake devices 12 and 13 to apply to the rear wheels 7 and 8 braking forces which correspond to a half of the difference between the torque distribution to the front wheels and the torque distribution to the rear wheels, thereby reducing the driving torque of the rear wheels (step S21).

After the step S22 or S21, the torque distribution changing means 26 determines in step S23 whether the vehicle is cornering. When it is determined that the vehicle is cornering, it is determined in step S24 whether the cornering flag F1 is in "1" position, that is, whether the vehicle is making a left cornering which causes a load shift toward the right wheels. When it is determined that the vehicle is making a left cornering, the torque distribution changing means 26 controls, in step S25, the brake devices 10 and 12 to apply to the left wheels 5 and 7 braking forces which correspond to a half of the difference between the torque distribution to the left wheels and the torque distribution to the right wheels, thereby reducing the driving torque of the left wheels. On the other hand, when it is determined that the vehicle is making a right cornering which causes a load shift toward the left wheels, the torque distribution changing means 26 controls, in step S26, the brake devices 11 and 13 to apply to the right wheels 6 and 8 braking forces which correspond to a half of the difference between the torque distribution to the left wheels and the torque distribution to the right wheels, thereby reducing the driving torque of the right wheels.

When it is determined in step S18 that the torque requirement Pr is larger than the maximum output torque Pmax, the outer/inner distribution ratio y is fixed to 0.5 in step S27. Then the value of the torque requirement Pr when the outer/inner distribution ratio y is 0.5 is calculated and then it is determined that the calculated value of the torque requirement Pr is smaller than the maximum output torque Pmax (step S28). When it is determined that the former is smaller than the latter, the torque distribution changing means 26 controls the engine controller 22 to converge the actual engine output torque on the torque requirement Pr (step S29). In the next step S30, it is determined whether the acceleration flag FO is in "1" position. When it is determined that the acceleration flag FO is in "0" position, i.e., that is vehicle is being accelerated, the torque distribution changing means 26 controls the brake devices 10 and 11 to apply to the front wheels 5 and 6 braking forces which correspond to a half of the difference between the torque distribution to the front wheels and the torque distribution to the rear wheels, thereby reducing the driving torque of the front wheels (step S32). On the other hand, when it is determined that the acceleration flag FO is in "1" position, i.e., that is vehicle is not being accelerated, the torque distribution changing means 26 controls the brake devices 12 and 13 to apply to the rear wheels 7 and 8 braking forces which correspond to a half of the difference between the torque distribution to the front wheels and the torque distribution to the rear wheels, thereby reducing the driving torque of the rear wheels (step S31).

On the other hand, when it is determined in the step S28 that the torque requirement Pr is still larger than the maximum output torque, it is determined in step S33 whether the acceleration flag FO is in "1" position. When it is determined that the acceleration flag FO is in "0" position, that is, the vehicle is being accelerated, the engine output is maximized in step S35 and the torque distribution changing means 26 controls the brake devices 10 and 11 to apply to the front wheels 5 and 6 braking forces which correspond to a half of the increase in the engine output torque, thereby reducing the driving torque of the front wheels (step S35). On the other hand, when it is determined that the acceleration flag FO is in "1" position, i.e., that is vehicle is not being accelerated, the torque distribution changing means 26 controls the brake devices 12 and 13 to apply to the rear wheels 7 and 8 braking forces which correspond to a half of the increase in the engine output torque, thereby reducing the driving torque of the rear wheels (step S34).

Generally, the running stability during cornering is more affected by the ratio of the torque distribution to the rear wheels to the torque distribution to the front wheels than the ratio of the torque distribution to the outer wheels to the torque distribution to the inner wheels. This is the reason why the outer/inner distribution ratio is fixed to 0.5 when it is determined in step S18 that the torque requirement Pr is larger than the maximum output torque Pmax. Further, when the torque requirement Pr is still larger than the maximum output torque Pmax eve when the outer/inner distribution ratio is fixed to 0.5, the difference between the torque distribution to the rear wheels and the torque distribution to the front wheels is enlarged as much as possible as described above in conjunction with the steps S34 and S35.

The torque distribution is changed in the following manner, for instance. Assuming that the vehicle is running with each of the front wheels and the rear wheels driven at a driving torque of 50 Kg-m, the engine output torque equivalent to the driving force of the wheels taking into account the gear ratio is 100 Kg-m. When the braking torque of a total of 30 Kg-m is applied to the front wheels in response to acceleration of the vehicle and the driving torque lost by the braking torque is compensated for by increase in the engine output torque, the engine output torque should be increased to 130 Kg-m. When the engine output torque is equally distributed to the front wheels and the rear wheels, 65 Kg-m each, the resulting torque distribution to the front wheels becomes 35 Kg-m (65-30) and that to the rear wheels becomes 65 Kg-m. In this case the rear wheel distribution ratio k is 0.65.

In this embodiment, the torque distribution to the front wheels and the rear wheels or to the left wheels and the right wheels is changed according to the actual load shift as described above in conjunction with the steps S6 and S10. This is advantageous over a conventional torque distribution control system in which the torque distribution is controlled according to the engine load since increase in the engine load is not always accompanied with a load shift.

FIG. 5 shows a flow chart showing the operation of the torque distribution changing means 26 in accordance with another embodiment of the present invention.

The 26 determines the longitudinal acceleration, the lateral acceleration, the amount of depression of the accelerator, the boost, and the steering angle on the basis of the signals from the sensors 23 and 30 to 34 at predetermined intervals (Steps S1 and S2).

Then, in step S3, it is determined whether the cornering flag F is reset to "1". The cornering flag F represents that the vehicle is running straight when it is in "0" position, that the vehicle is entering a corner when it is in "1" position, that the vehicle is in an intermediate position of the corner when it is "2" position and that the vehicle is going out of the corner when it is in "3" position.

In the initial state, the cornering flag F is in "0" position, and it is determined in step S4 whether the steering angle is larger than a predetermined value. When it is determined that the steering angle is larger than the predetermined value (This is the case when the vehicle which has been running straight begins to make a cornering.), the cornering flag F is set to "1" in step S5. In the next step S6, the torque distribution changing means 26 calculates the present engine output torque Ps on the basis of the boost and the throttle opening or the amount of depression of the accelerator pedal.

In step S7, it is determined whether there remains a torque margin larger than Ps/2. In this particular embodiment, the rear wheel distribution ratio k is set to be 0.75 when the vehicle is entering a corner, and the value of Ps/2 is selected on the basis of this value, 0.75, that is, in order to obtain the rear wheel distribution ratio k of 0,75, 1.5 times as large as the present engine output torque PS is required. When it is determined in the step S7 that there remains a torque margin larger than Ps/2, the torque distribution changing means 26 controls the brake devices 10 and 11 to apply to the front wheels 5 and 6 braking forces (Ps/4) which correspond to a half (0.5) of the difference between the torque distribution to the front wheels and the torque distribution to the rear wheels (0.75-0.25), thereby reducing the driving torque of the front wheels (step S8). Further, the torque distribution changing means 26 increases the throttle opening to converge the actual engine output torque on the torque requirement $1.5 \times Ps$ (step S9). Thus, the torque distribution for entering a corner (0.75) is obtained, and the vehicle is given an oversteer tendency.

When it is determined in the step S7 that there does not remain a torque margin sufficient to obtain the torque distribution for entering a corner, the torque margin Pm is calculated on the basis of the difference between the maximum output torque Pmax and the present engine output torque Ps in step S10. Then, in step S11, the torques distribution changing means 26 controls the brake devices 10 and 11 to apply to the front wheels 5 and 6 braking forces which correspond to a half of the torque margin Pm, and in step S12, the torque distribution changing means 26 controls the engine controller 22 to maximize the engine output torque.

As the cornering flag F is set to "1" in the step S5, the answer in the step S3 becomes NO and the torque distribution changing means 26 proceeds to step S13 and determines whether the the cornering flag F is in "1" position. Since the answer is naturally YES, the torque distribution changing means 26 thereafter proceeds to step S14. In the step S14, the torque distribution changing means 26 determines whether the steering angle is increasing in order to know whether the vehicle is still entering the corner. When it is determined that the vehicle is still entering the corner, the torque distribution changing means 26 controls the engine controller 22 and the brake controller 25 to control the engine output and the braking force in proportion to each other according to the amount of depression of the accelerator pedal in order to control the engine output according to the driver's operation of the accelerator pedal without changing the torque distribution.

When it is determined in the step S14 that the increase of the steering angle is stopped, the torque distribution changing means 26 sets the cornering flag F to "2" in step S16 and controls brake controller 25 to release the braking forces from the front wheels in step S17. Then, in step S18, the torque distribution changing means 26 controls the engine controller 22 to control the engine output according to the amount of depression of the accelerator pedal with the engine output torque is equally distributed to the front wheels and the rear wheels.

As the cornering flag F is set to "2" in the step S16, the answer in the step S13 becomes NO and the torque distribution changing means 26 proceeds to step S19 and determines whether the the cornering flag F is in "2" position. Since the answer is naturally YES, the torque distribution changing means 26 thereafter proceeds to step S20. In the step S20, the torque distribution changing means 26 determines whether the steering angle begins to decrease in order to know whether the vehicle is still in an intermediate position of the corner. When the answer is NO, the torque distribution changing means 26 returns to the step S17.

When the answer in the step S20 turns YES, the cornering flag F is set to "3" in step S21. In the next step S22, the torque distribution changing means 26 calculates the present engine output torque Ps on the basis of the boost and the throttle opening or the amount of depression of the accelerator pedal. Then, in step S23, it is determined whether there remains a torque margin larger than Ps/2. In this particular embodiment, the front wheel distribution ratio is set to be 0.75 when the vehicle is going out of a corner, and the value of Ps/2 is selected on the basis of this value, 0.75, that is, in order to obtain the front wheel distribution ratio of 0,75, 1.5 times as large as the present engine output torque PS is required. When it is determined in the step S23 that there remains a sufficient torque margin, the torque distribution changing means 26 controls the brake devices 12 and 13 to apply to the rear wheels 7 and 8 braking forces (Ps/4) which correspond to a half (0.5) of the difference between the torque distribution to the front wheels and the torque distribution to the rear wheels (0.75-0.25), thereby reducing the driving torque of the rear wheels (step S24). Further, the torque distribution changing means 26 increases the throttle opening to converge the actual engine output torque on the torque requirement 1.5×Ps (step S25). Thus, the torque distribution for going out of a corner (0.75) is obtained, and the vehicle is given an understeer tendency.

When it is determined in the step S23 that there does not remain a torque margin sufficient to obtain the torque distribution for going out of a corner, the torque margin Pm is calculated on the basis of the difference between the maximum output torque Pmax and the present engine output torque Ps in step S26. Then, in step S27, the torque distribution changing means 26 controls the brake devices 12 and 13 to apply to the front wheels 7 and 8 braking forces which correspond to a half of the torque margin Pm, and in step S28, the torque distribution changing means 26 controls the engine controller 22 to maximize the engine output torque.

As the cornering flag F is set to "3" in the step S21, the answer in the step S19 becomes NO and the torque distribution changing means 26 proceeds to step S29. In the step S29, the torque distribution changing means 26 determines whether the steering angle becomes smaller than a predetermined value in order to know whether the vehicle has gone out of the corner. When it is determined that the steering angle is still larger than the predetermined value and the vehicle is still going out of the corner, the torque distribution changing means 26 controls the engine controller 22 and the brake controller 25 to control the engine output and the braking force in proportion to each other according to the amount of depression of the accelerator pedal in order to control the engine output according to the driver's operation of the accelerator pedal without changing the torque distribution. When it is determined that the steering angle becomes smaller than the predetermined value, the torque distribution changing means 26 resets the cornering flag F to "0" in step S31. The torque distribution during a cornering is thus controlled.

The torque distribution is changed in the following manner, for instance. Assuming that the vehicle is running with each of the front wheels and the rear wheels driven at a driving torque of 50 Kg-m, the engine output torque equivalent to the driving force of the wheels taking into account the gear ratio is 100 Kg-m. When the braking torque of a total of 50 Kg-m is applied to the front wheels in response to entrance of the vehicle into a corner and the driving torque lost by the braking torque is compensated for by increase in the engine output torque, the engine output torque should be increased to 150 Kg-m. When the engine output torque is equally distributed to the front wheels and the rear wheels, 75 Kg-m each, the resulting torque distribution to the front wheels becomes 25 Kg-m (75-30) and that to rear wheels becomes 75 Kg-m. In this case the rear wheel distribution ratio k is 0.75.

By changing the torque distribution in this manner, the cornering performance of the vehicle can be improved. That is, when the torque distribution to the rear wheels during entrance of the vehicle into a corner, an oversteer tendency is given to the vehicle and the heading performance during entrance into the corner can be improved, and when the torque distribution to the front wheels is increased during exit from the corner, an understeer tendency is given to the vehicle and the straight running performance during exit from the corner can be improved.

Though, in the embodiments described above, the braking system is arranged so that the braking forces for the four wheels can be controlled separately from each other, the braking system may be arranged so that separate control of the braking force for the front wheels and the braking force for the rear wheels can only be accomplished or may be arranged so that separate control of the braking force for the left wheels and the braking force for the right wheels can only be accomplished.

We claim:

1. A torque distribution control system for a four-wheel drive vehicle comprising
an engine output control means which controls the output of the engine of the vehicle,
a braking control means which separately controls the braking forces applied to the left wheels and the right wheels and/or the braking forces applied to the front wheels and the rear wheels, and
a torque distribution changing means which determines the torque distribution to the wheels according to the running conditon of the vehicle, and controls the braking control means and the engine output control means to apply a braking force to one of the front wheels and the right wheels and to increase the output of the engine by an amount substantially corresponding to the braking force applied to said one of the front wheels and the rear wheels or said one of the left wheels and the right wheels so that said torque distribution determined according to the running condition of the vehicle can be maintained with a total applied torque to all the wheels being substantially constant.

2. A torque distribution control system as defined in claim 1 in which said torque distribution changing means includes a torque margin determining means which determines whether the output of the engine can be increased by the amount substantially corresponding to the braking force applied to said one of the front wheels and the rear wheels or said one of the left wheels and the right wheels, and the torque distribution changing means corrects the torque distribution according to the amount by which the output of the engine can be increased when the output of the engine cannot be increased by the amount substantially corresponding to the braking force applied to said one of the front wheels and the rear wheels or said one of the left wheels and the right wheels.

3. A torque distribution control system as defined in claim 2 in which said torque distribution changing means actually controls the torque distribution to the front wheels and the rear wheels and to the left wheels and the right wheels on the basis of the torque distribution determined so long as the output of the engine can be increased by the amount substantially corresponding to the braking force applied to both said one of the front wheels and the rear wheels and said one of the left wheels and the right wheels, and corrects the torque distribution to the left wheels and the right wheels according to the amount by which the output of the engine can be increased when the output of the engine cannot be increased by the amount substantially corresponding to the braking force applied to both said one of the front wheels and the rear wheels and said one of the left wheels and the right wheels.

4. A torque distribution control system as defined in claim 1 in which said torque distribution changing means determines the torque distribution according to the acceleration of the vehicle.

5. A torque distribution control system as defined in claim 1 in which said torque distribution changing means determines the torque distribution according to the longitudinal acceleration of the vehicle so that the torque distribution to the rear wheels is increased with increase in the longitudinal acceleration.

6. A torque distribution control system as defined in claim 1 in which said torque distribution changing means includes a cornering detecting means and said torque distribution means increases the torque distribution to the rear wheels when said cornering detecting means detects that the vehicle is entering a corner and increases the torque distribution to the front wheels and said cornering detecting means detects that the vehicle is going out of the corner.

7. A torque distribution control system as defined in claim 6 in which said cornering detecting means detects entrance of the vehicle to a corner and exit of the vehicle from the corner on the basis of the steering angle.

8. A torque distribution control system as defined in claim 7 in which said cornering detecting means determining that the vehicle is entering a corner when the steering angle is increasing and that the vehicle is going out of the corner when the steering angle is decreasing.

9. A torque distribution control system as defined in claim 6 in which said torque distribution changing means increases the torque distribution to the right wheels when the vehicle is making a left cornering, and increases the torque distribution to the left wheels when the vehicle is making a right cornering.

10. A torque distribution control system as defined in claim 9 in which said cornering detecting means determines the direction of the cornering by way of a signal from a mean for detecting the lateral acceleration of the vehicle.

11. A torque distribution control system as defined in claim 9 in which said cornering detecting means determines the direction of the cornering by way of a steering angle.

12. A torque distribution control system for a four-wheel drive vehicle comprising
an engine output control means which controls the output of the engine of the vehicle,
a braking control means which separately controls the braking forces applied to the left wheels and the right wheels and/or the braking forces applied to the front wheels and the rear wheels,
an acceleration detecting means which detects the longitudinal acceleration of the vehicle,
a cornering detecting means which detects that the vehicle is making a cornering, and
a torque distribution changing means which determines the torque distribution to the wheels on the basis of signals from the acceleration detecting means and the cornering detecting means so that the torque distribution to the rear wheels is increased with increase in the longitudinal acceleration, and the torque distribution to the rear wheels is increased when the vehicle is entering a corner and the torque distribution to the front wheels is increased when the vehicle is going out of the corner, and controls the braking control means and the engine output control means to apply a braking force to one of the front wheels and the rear wheels or one of the left wheels and the right wheels and to increase the output of the engine by an amount substantially corresponding to the braking force applied to said one of the front wheels and the rear wheels or said one of the left wheels and the right wheels so that said torque distribution determined according to the running condition of the vehicle can be obtained.

13. A torque distribution control system as defined in claim 12 which further comprises a means for detecting the direction of cornering of the vehicle and in which said torque distribution changing means increases the torque distribution to the right wheels when the vehicle is making a left cornering, and increases the torque distribution to the left wheels when the vehicle is making a right cornering.

14. A torque distribution control system as defined in claim 13 which further comprising a torque margin determining means which determines whether the output of the engine can be increased by the amount substantially corresponding to the braking force applied to said one of the front wheels and the rear wheels or said one of the left wheels and the right wheels, and in which said torque distribution chaning means actually controls the torque distribution to the front wheels and the rear wheels and to the left wheels and the right wheels according to the torque distribution determined so long as the output of the engine can be increased by the amount substantially corresponding to the braking force applied to both said one of the front wheels and the rear wheels and said one of the left wheels and the right wheels, and corrects the torque distribution to the left wheels and the right wheels according to the amount by which the output of the engine can be increased when the output of the engine cannot be increased by the amount substantially corresponding to the braking force applied to both said one of the front wheels and the rear wheels and said one of the left wheels and the right wheels.

15. A torque distribution control system as defined in claim 14 in which when the output of the engine cannot be increased by the amount substantially corresponding to the braking force applied to said one of the front wheels and the rear wheels even if the torque is evenly distributed to the left wheels and the right wheels, the torque distribution changing means control the engine output control means to maximize the output of the engine and the braking control means to apply to one of the front wheels and the rear wheels a braking force corresponding to a half of the increase in the output of the engine.

16. A torque distribution control system for a four-wheel drive vehicle comprising a means for detecting the acceleration of the vehicle, a torque distribution determining means which determines the torque distribution to the front wheels and the rear wheels according to the acceleration of the vehicle, and a means for controlling the torque distribution to the front wheels and the rear wheels on the basis of the torque distribution determined by the torque distribution determining means so that a total applied torque to the front wheels and the rear wheels is maintained substantially constant.

17. A torque distribution control system for a four-wheel drive vehicle comprising as means for detecting entrance of the vehicle into a corner and exit of the vehicle from the corner, a torque distribution determining means which determines the torque distribution to the front wheels and the rear wheels so that the torque distribution to the rear wheels is increased when the vehicle is entering a corner and the torque distribution to the front wheels is increased when the vehicle is going out of the corner, and a means for controlling the torque distribution to the front wheels and the rear wheels on the basis of the torque distribution determined by the torque distribution determining means.

* * * * *